United States Patent Office 3,641,188
Patented Feb. 8, 1972

3,641,188
PROCESS FOR POLYMERIZING OLEFINS
Jin Sun Yoo, Riverdale, and Robert Koncos, Park Forest, Ill., assignors to Atlantic Richfield Company
No Drawing. Filed May 8, 1968, Ser. No. 727,735
Int. Cl. C07c 3/10
U.S. Cl. 260—683.15 D
19 Claims

ABSTRACT OF THE DISCLOSURE

A catalyst composition consisting essentially of:
(A) a lanthanide series metal compound, e.g., cerous acetylacetonate,
(B) a reducing agent, e.g., ethylaluminum sesquichloride,
(C) a non-protonic Lewis acid, e.g., ethylaluminum sesquichloride, and, as optional, preferred ingredients,
(D) a trihydrocarbylphosphine, e.g., triphenylphosphine, and
(E) an inert, organic solvent, e.g., chlorobenzene, is disclosed as being useful for catalyzing the polymerization of olefins or phenyl-substituted olefins to normally liquid polymers or oligomers, e.g., for catalyzing the dimerization of propylene.

---

The present invention relates to a novel catalyst composition and to the use of such catalyst in the polymerization or oligomerization of olefins and phenyl-substituted olefins to low molecular weight polymers or oligomers. More particularly, the invention relates to a lanthanide series metal-containing catalyst system, e.g., cerium-containing, especially useful in catalyzing the dimerization of propylene.

Numerous catalyst systems have been disclosed in the prior art as being suitable for the preparation of polymers of olefins such as alpha-mono-olefins and conjugated diolefins, particularly to form low molecular weight dimers, trimers, tetramers, etc. of such olefins. Normally gaseous olefins such as propylene have, for example, been effectively dimerized using these catalyst systems to produce hexene fractions of varying composition. The polymeric and oligomeric products produced in such reactions are often valuable in either the petrochemical field or the fuel industry or both. One of the major fractions of dimeric propylenes, 2-methylpentenes, can be utilized, for instance, for the synthesis of isoprene. Another propylene dimerization product, 2,3-dimethylbutene is useful as a feed for the production of 2,3-dimethylbutadiene which in turn can be used in a multi-step synthesis of pyromellitic anhydride, or can be hydrogenated to yield 2,3-dimethylbutane, useful as an octane-enhancing ingredient in gasoline. The latter compound, for example, has the highest research octane number (103.5) of those paraffins having boiling points up to 140° F.

It has now been found that a catalyst composition containing a metal of the lanthanide series is extremely active in catalyzing the polymerization or oligomerization of such olefins to normally liquid polymers or oligomers, e.g., dimers, trimers, tetramers, etc. The catalyst composition of the present invention comprises a combination of (A) a lanthanide series metal compound, (B) a reducing agent, (C) a non-protonic Lewis acid and, as an optional ingredient, (D) a trihydrocarbylphosphine. As will be discussed hereinafter, ingredients (B) and (C) can both be supplied by a single component which performs both reducing agent and Lewis acid functions. Preferably, there will also be included in the catalyst composition an inert organic solvent in amounts up to about 99 percent, preferably about 80 to 90 to 95 percent, based on the combined weight of (A), (B), (C), (D) and said solvent, i.e. based on the weight of the total catalyst composition.

The lanthanide series metal compound, component A of the catalyst composition, may be supplied by various lanthanide series metal compounds, including lanthanide series metal salts of mineral acids, lanthanide series metal salts of carboxylic acids of at least 4 carbon atoms and lanthanide series metal complexes. As examples of suitable mineral acid salts may be mentioned the lanthanide series metal nitrates, cyanides, halides (especially the chlorides and bromides), etc. The carboxylic acids whose lyanthanide series metal salts can be employed as component A in the composition will generally have at least 4 carbon atoms and can have as high as about 30 or more carbon atoms. Included among the suitable acids are poly-, e.g. di-, carboxylic acids as well as monocarboxylic acids, and aromatic as well as aliphatic (including cycloaliphatic) carboxylic acids. Ethylenically-unsaturated as well as saturated carboxylic acid salts can be employed also. Thus there can be used, for example, salts of the following acids: phenylacetic, phenylpropionic, caproic, palmitic, stearic, vinylacetic, undecenoic, crotonic, adipic, decane-1, 10-dicarboxylic, muconic, cyclohexane carboxylic, cyclohexane dicarboxylic, benzoic, naphtonic, phthalic, isophthalic, terephthalic, dimethoxyacetic, dimethoxypropionic, dimethoxyacrylic, dimethoxymonochloroacetic, dimethoxybenzoic, dimethoxymalonic, dimethoxyadipic, etc. The hydrocarbon carboxylic acids are often preferred, and among the fatty acids those of 4 to 7 carbon atoms are often preferred.

It is frequently advantageous to employ as component A of the composition a lanthanide series metal complex, preferably one wherein the electron donor portion is a weak field ligand. The term "complex" is here used synonymously with coordination compound and is intended to embrace complexes with monodentate complexing agents, i.e. those agents which contain only one electron donor group, as well as complexes with polydentate complexing agents, i.e. those agents, usually organic, which contain two or more electron donor groups. The latter complexes, known as "chelates," are often preferred for use in the catalyst composition of the present invention. There may advantageously be employed those complexing agents wherin the electeron donor atoms are selected from the non-metallic elements of Groups V–A and VI–A of the Periodic Table, e.g., O, N, S and P. As suitable oxygen-containing complexing agents there may be mentioned, for instance, carbonyl, hydroxyl and carboxylate group containing compounds, and often preferred are, for example, the beta-diketones, the beta-hydroxyaldehydes, the beta-ketocarboxylic acid esters, the dialkoxy-carboxylic acid esters, etc. As suitable nitrogen-containing complexing agents may be mentioned, for instance, primary, secondary and tertiary amino group containing compounds as well as oximes, imines and imides. As examples of suitable sulfur-containing complexing agents there may be mentioned the thioalcohols, thioketones thioethers, etc. And as suitable phosphorus-containing complexing agents there may be mentioned, for instance, the phosphines. The oxygen-containing complexes are often preferred for use in the catalyst composition of the present invention, and as specific examples of such may be mentioned: acetylacetonates, propionylacetonates, benzoylacetonates, complexes with salicylaldehyde, etc.

Often preferred as the lanthanide series metal is cerium, which may be supplied either as a cerous or a ceric compound, for example as cerous acetylacetonate.

The reducing agent, component B, is supplied by a compound which is compatible with component C, the Lewis acid, and which is capable of reducing the lanthanide series metal in the lanthanide series metal compound, preferably to an oxidation state lower than 1 and even to zero. The reducing agent should not, however, be effective to reduce the metal to its elemental state.

The Lewis acid, component C, is supplied by a compound which is other than a protonic, or hydrogen, acid and which is capable of receiving one or more pairs of electrons to form a coordinate covalent bond. Lewis acids are well known to the art and are fully defined, for example, by Nolher, "Chemistry of Organic Compounds," W. B. Sanders Company, 1951, at pages 233–235; by Stone, Chemical Review, vol. 58, 1958, at page 101; and by their namesake, G. N. Lewis, Journal of the Franklin Institute, 226, 293 (1938).

As mentioned above, both B and C may be supplied by a single compound which performs both functions. As examples of such a compound may be mentioned the acidic organometal halides which correspond to the general formula $$R'_{(n-y)}MX_y$$

wherein M is a metallic element of coordination number $n$ whose halides are Lewis acids, X is halogen having an atomic number of 9 to 53 (i.e., fluorine, chlorine, bromine or iodine), R' is hydrocarbyl, e.g. alkyl, of 2 to about 6 carbon atoms and $y$ is a number having a value from greater than 0 to less than $n$, often having a value from 1 to $n-1$. Often preferred metallic elements in the above compound include aluminum, zinc and tin. As examples of suitable such acidic organometal halides may be mentioned the alkylaluminum halides, including mono-, sesqui- and dihalides, and as specific examples of suitable alkylaluminum halides may be mentioned diethylaluminum chloride, iodide and bromide; ethyl aluminum dichloride, diiodide and dibromide; and ethylaluminum sesquichloride, sesquiiodide and sesquibromide.

When, however, the particular reducing agent employed in the composition does not also perform as a Lewis acid, it is necessary to separately supply the Lewis acid to the catalyst composition. Examples of reducing agents which are suitable as component B in the composition but which do not perform satisfactorily as Lewis acids therein include trialkylaluminums, monoalkoxy-dialkylaluminums, and dialkylaluminum hydrides wherein the alkyl and alkoxy groups contain up to about 6 carbon atoms: Grignard reagents; allyl and alkyl tin complexes; and compounds of the formula M'AlR'''$_4$ and M'BeR'''$_3$ is an alkali metal, e.g., sodium, lithium or potassium, and R''' is alkyl, for example of 2 to 6 carbon atoms.

And, correspondingly, as examples of suitable Lewis acids which do not perform as reducing agents in the system may be mentioned aluminum chloride, zinc chloride, stannic chloride, boron trifluoride, boron trifluoride etherates, e.g., the diethyl etherate, etc.

The trihydrocarbylphosphine component, optional ingredient (D) of the catalyst of the present invention, can be supplied by a compound corresponding to the general formula $R_3P$ wherein R is a hydrocarbon radical of 1 to about 12 carbon atoms. Preferably, R is selected from the group consisting of alkyl, aryl, alkaryl and aralkyl radicals and is devoid of olefinic or acetylenic unsaturation; different R's may, of course, be present in the same phosphine molecule. When the phosphine component contains aromatic groups it is generally preferred that these have mono-cyclic structures, i.e., that the groups be selected from phenyl, alkylphenyl, or phenyl-alkyl radicals.

The presence of the phosphine component, which apparently can enter into a complex-forming reaction with the lanthanide series metal compound, makes for a more active catalyst composition. It is seen that the phosphine component is monodentate, or unidentate, i.e., unifunctional, as regards the phosphorus atom. Use of multi-functional phosphines such as bis(diphenylphosphino)-ethane in place of the unidentate phosphine in the catalyst composition of the present invention has been found, for example, to result in a composition showing no catalytic activity for the dimerization of propylene. As examples of suitable phosphines, then, may be mentioned triphenylphosphine, trimethylphosphine, tricyclohexylphosphine, tri-n-hexylphosphine, tri-n-decylphosphine, tribenzylphosphine, tri-(4 - n - butylphenyl)phosphine, and the like.

The molar ratio of component B (reducing agent) to component A (lanthanide compound) in the catalyst composition is about 3 to 40:1, preferably about 5 to 30:1. (For reasons of economics, however, it may often be preferably to employ no more than about 15 moles of component B per mole of component A). Similarly, the molar ratio of component C (Lewis acid) to component A (lanthanide compound) is also about 3 to 40:1, preferably about 5 to 30:1. (Again, for economic reasons it may be preferable to employ no more than about 15 moles of component C per mole of component A).

Where optional component D (phosphine) is included in the composition it can generally be present in amounts up to about 10 moles or more per mole of component A, and will often be present in amounts of about 1 to 6 moles per mole of said component A. (Economic considerations, however, may dictate that no more than about 4 or 5 moles of phosphine be employed per mole of component A).

The trihydrocarbylphosphine component, if employed, may advantageously be pre-admixed with the lanthanide series metal compound and the reducing agent and Lewis acid added to the resultant mixture. Depending upon the pre-admixing temperature and the particular lanthanide series metal comupound and phosphine employed, it is believed that the lanthanide compound and the trihydrocarbylphosphine may react together, for instance in an approximately equimolar ratio, to form a complex. It is further thought that some of the phosphine, when brought into contact with the remaining components of the catalyst composition, i.e. Components B and C, might also enter into a complex-forming reaction with those components as well. Accordingly, there may be present in the catalyst composition amounts of trihydrocarbylphosphine in excess of that, if any, which is complexed with the lanthanide series metal compound. Where, for example, an acidic organometal halide or a trialkylaluminum is employed in the composition it is preferred that there be an excess of trihydrocarbylphosphine present, i.e. in addition to that which is complexed with the lanthanide series metal compound, this excess apparently complexing with a portion of the acidic organometal halide or trialkylaluminum to form a more active catalytic composition.

As indicated above, the preparation of the preferred catalyst composition, i.e. that wherein component D is included, is preferably conducted by first admixing the trihydrocarbylphosphine with the lanthanide series metal compound in the presence of a suitable organic solvent and then adding to the resultant solution or suspension the reducing agent (component B) and the Lewis acid (component C). The pre-admixing of components A and D may be conducted at room temperature or lower, or as high as about 300° F. The use of elevated temperatures, say about 120° F. or higher, and often from about 120 to 200° F., is believed to be more conductive to the formation of a complex between the lanthanide compound and the phosphine compound than are room temperatures or lower. It is often desirable to wait a short period of time after pre-admixing components A and D, say about 5 to 30 minutes, before adding components B and C to the pre-admixture.

Where component D is omitted from the catalyst composition, no advantage is known to reside in the use of any particular mixing sequence and the composition can be formulated by simply admixing components A, B and C, preferably in a suitable organic solvent.

Suitable solvents for the admixing procedures described above include the same solvents as those which are suitable for use in the final catalyst composition. If desired, however, where components A and D are pre-admixed, such pre-admixing may be accomplished in a solvent which is unsuitable for use in the final catalyst composition; in this case the pre-admixing solvent should then be removed from the solution or suspension and the residue re-dissolved or re-suspended in a proper solvent which is inert to the final catalyst composition.

Suitable organic solvents for the final catalyst composition are those which are inert to the catalyst and which will not enter into, or deleteriously affect, the eventual polymerization or oligomerization reaction. As specific examples thereof may be mentioned aromatic and aliphatic hydrocarbons and their halogenated, e.g. chlorinated, derivatives such as, for instance, chlorobenzene. Oxygen-containing solvents are generally to be avoided for this purpose.

The combining of the catalyst components is preferably conducted in a dry, inert atmosphere, out of the presence of air, for instance in an autoclave. Within a relatively short period of time after the admixing of all the components, e.g. about 5 to 15 minutes, an active catalyst composition is formed which may be used to catalyze the polymerization or oligomerization reaction.

The catalyst composition of the present invention may be used to catalyze the production of liquid polymers or oligomers of olefins of 2 to 6, or even 8, carbon atoms, as well as monophenyl or diphenyl derivatives thereof. By the terms "polymerization" and "polymer" it is meant to include herein copolymerization and copolymers as well as homopolymerization and homopolymers, and oligomerization and oligomers, e.g. dimerization and dimers, trimerization and trimers, etc., as well as cross- or co-oligomerization, e.g., cross- or co-dimerization, etc. For example, by cross-dimerization, used here as being synonymous with co-dimerization, is meant the addition reaction combining one mole of a first olefin, for instance propylene, with one mole of a second olefin, for instance, butene, to form one mole of a cross-dimer, for instance heptene. By dimerization, on the other hand, is meant the addition reaction which simply combines two moles of a single olefin, for instance propylene, to form the respective dimer, for instance hexane. Polymerization and polymers are the terms here used to embrace all of these reactions and reaction products.

Thus, suitable feeds include, for instance, monoethylenically unsaturated olefins, preferably alpha-olefins, such as ethylene, propylene and isobutene; poly-ethylenically unsaturated olefins, preferably the dienes, such as butadiene-1,3; and phenyl-substituted derivatives of the foregoing olefins, such as styrene, 1,4-diphenylbutadiene-1,3 and 1-phenylbutadiene-1,3. The polymers produced by the action of the present catalyst composition will often be of 2 to about 4 monomer units per molecule, i.e., will often range from dimers to tetramers. The catalyst composition has been found, for example, to be especially suitable for the production of hexane fractions by the dimerization of propylene.

Polymerization can be effected by contacting the olefinically-unsaturated feed at a temperature of about 10 to 300° F., preferably about 90 to 125° F., and at atmospheric, elevated or reduced pressures. Suitable pressures include about 0 to 1000 p.s.i.g., preferably about 300 to 600 p.s.i.g. The amount of catalyst composition used in the reaction is that sufficient to effect polymerization of the feed and often is about 0.1 to 1% of catalyst composition (not including the solvent therefor) based on the weight of hydrocarbon feed.

The invention will be better understood by reference to the following examples.

EXAMPLE I

A 300 cc. stainless steel autoclave equipped with an air driven magnetic stirrer was used as a reactor. One mmole (millimole) of cerous acetylacetonate, $Ce(acac)_3$, and 3.7 mmoles of triphenyl phosphine, $\phi_3P$, were charged simultaneously into the reactor with 40 ml. of chlorobenzene. While the reactor was purged with nitrogen, these components were vigorously stirred at a temperature of 75–85° F. for about twenty minutes. The reactor was partially evacuated to introduce a chlorobenzene solution of ethylaluminum sesquichloride, $Et_3Al_2Cl_3$, (28 mmoles) by suction through a syringe needle which was connected to a sampling valve. A small amount (5 ml.) of fresh chlorobenzene was drawn into the reactor to clear the residue of $Et_3Al_2Cl_3$ retained in the syringe needle. The total amount of chlorobenzene introduced into the reactor was 90 g. The reactor was tightly closed and the system was stirred for five minutes. Propylene was added into the reactor at less than 150 p.s.i.g. without heating the system. Liquid propylene, in the amount of 240 ml., was fed from a blow case to the reactor within 30 minutes. When addition of propylene was discontinued the system was allowed to react for an additional 60 minutes. In the course of reaction the pressure of the system continually dropped to 40 p.s.i.g. and the temperature was maintained in the range of 100° to 125° F. with the heat liberated by the reaction. Reaction was discontinued by discharging the light yellow reaction mixture into a cold flask through the syringe needle and quenching by the addition of dilute hydrochloric acid. The organic layer was isolated from a milky aqueous acid portion, dried over anhydrous sodium sulfate, and distilled into fractions. One hundred and three grams of propylene dimer product was recovered.

Thus, 103 g. of propylene was converted to product with 1 mmol of catalyst solution (based on cerium content) within 90 minutes. This time period includes any induction period (possibly 20–30 minutes) which may have been required to form an active catalyst species. Total product was obtained in more than 85% yield. The structures of the products were identified by means of gas chromatography, mass spectroscopy, and hydrogenation. Details of reaction conditions, catalyst compositions, and product distributions are listed in Tables I and II.

EXAMPLE II

Both 1.1 mmoles of $Ce(acac)_3$ and 4.8 mmoles of $\phi_3P$ were weighed into a reactor as in Example I. Stirring was continued for 30 minutes and then a chlorobenzene solution of 24 mmoles of $Et_3Al_2Cl_3$ was added to the reactor. Propylene was then fed at 600 p.s.i.g. without heating the catalyst solution. About 60 minutes were required to feed 240 ml. of propylene. Soon after the addition of propylene was stopped, the pressure rapidly dropped to 200 p.s.i.g. and there was further observed a very slow pressure drop during an additional 3½ hours of stirring. At the final stage the pressure was 90 p.s.i.g. and the temperature was 95° F. In this run, 114 g. of reacted propylene was recovered (92% yield) during the 4½ hour reaction period. The composition of the $C_6$ olefin fraction was roughly 78% 2-methylpentenes and 2,3-dimethylbutenes and 22% n-hexenes. The total $C_6$ olefin fraction amounted to 95% of the total amount of product, and less than 5% of the product was $C_9$-olefin fraction. In comparing the reaction time period of this run and Example I, it is obvious that no appreciable product increase was obtained by prolonging the reaction time from 90 minutes to 4½ hours. Therefore, the formation of propylene dimer is essentially complete in less than 90 minutes. In Tables I, II and III more details of the reaction and products are described.

EXAMPLE III

In another run, 1.1 mmoles of $Ce(acac)_3$, 4.8 mmoles of $\phi_3P$, and 27 mmoles of $Et_3Al_2Cl_3$ were charged into the reactor along with 75 g. of chlorobenzene solvent in the same manner as in the previous examples. Addition of propylene immediately followed the addition of the halide, and, unlike the procedure in Examples I and II, heating of the system was started at the same time. Since the exothermicity of the reaction raised the temperature of the system to 135° F., however, heating was discontinued. Soon after completion of the addition of 240 ml. of propylene at 600 p.s.i.g. over 40 minutes, the pressure of the system very rapidly dropped to 250 p.s.i.g. within a few minutes. From this pressure it dropped very slowly to 50 p.s.i.g. during an additional 110 minutes. The organic portion (120 g., excluding chlorobenzene solvent) was isolated from the aqueous portion, and by distillation 117 g. of the product was recovered. Therefore, 117 g. of propylene was converted with 1.1 mmoles Ce catalyst solution in 2½ hours. The actual time period required for the reaction of the designated amount of propylene appears to be much shorter than 2½ hours.

EXAMPLE IV

One mmole of $Ce(acac)_3$, 4.8 mmoles of $\phi_3P$, and 30 mmoles of $Et_3Al_2Cl_3$ were charged (along with 82 g. of chlorobenzene solution) into the reactor according to the above examples. Propylene was immediately introduced after addition of the aluminum halide at less than 100 p.s.i.g. (100–50 p.s.i.g.) without heating the system. Two and one-half hours were required to complete the feeding of 200 ml. of propylene into the reactor. Seventy-five grams of product was recovered in 74% yield. Product data is listed in Tables II and III.

EXAMPLE V

A binary catalyst system was prepared with 1 mmole of $Ce(acac)_3$ and 24 mmoles $Et_3Al_2Cl_3$ in chlorobenzene in the 300 cc. autoclave reactor. Introduction of propylene at 400 p.s.i.g. was started after several minutes, and the temperature was maintained at 110–120° F. throughout the reaction. The rate of propylene absorption was much lower than that observed in the previous ternary catalyst solution. About 230 ml. of propylene was fed into the reactor in 1 hour. The system was stirred for an additional 2 hours after propylene addition. The pressure dropped to a minimum of 280 p.s.i.g. within 30 minutes after the addition of propylene was complete. Further pressure drop was negligible over the next 1½ hours. Propylene dimer, in the amount of 82 g., was recovered from the reaction mixture. Thus, only 82 g. of propylene was converted to product using 1 mmole of Ce catalyst solution for 180 minutes.

This indicates that the third component, triphenylphosphine, remarkably affected the catalytic activity and yield of the product in the previous examples.

EXAMPLE VI

A bright orange solution was prepared under nitrogen atmosphere in a glass bottle by mixing 0.5 mmole of $Ce(acac)_3$ and 5.5 mmoles of $\phi_3P$ in 66 g. of chlorobenzene. A chlorobenzene solution of $Et_3Al_2Cl_3$ was slowly injected into the orange solution with ice-water cooling. As soon as $Et_3Al_2Cl_3$ was added, the color rapidly faded to yield a colorless clear solution. After the catalyst solution was removed from the ice-water bath, propylene was bubbled through the catalyst solution at atmospheric pressure and room temperature by means of a syringe needle. Vent gas from the reactor was condensed in a cold trap. Absorption and reaction of propylene were continuously observed by both elevation of liquid level in the catalyst solution and increase of condensate in the cold trap. An organic layer was isolated from an aqueous portion after the reaction mixture was quenched with dilute HCl. Presence of hexene product in the organic portion was confirmed by gas chromatography. It was noted that even after the propylene had been bubbled through the solution for a few hours at room temperature, the catalyst was still stable and active at that time.

EXAMPLE VII

In another run, the catalyst solution was prepared with 1 mmole of $Ce(acac)_3$, 5.1 mmoles of $\phi_3P$, and 32 mmoles of $Et_3Al_2Cl_3$ in 90 g. of chlorobenzene. Butene-1 was introduced into the catalyst solution, and the reaction was allowed to proceed at 120° F. and 500 p.s.i.g. for 4 hours. While the system was less active for this polymerization of butene-1 than it was for propylene, the presence of octenes in the reaction mixture of this example was confirmed by means of gas chromatography.

TABLE I

Catalyst Composition and Reaction Conditions

| | Catalyst composition, millimoles | | | | Reaction conditions | | |
|---|---|---|---|---|---|---|---|
| Example No. | $Ce(acac)_3$ | $\phi_3P$ | $Et_3Al_2Cl_3$ | Chlorobenzene (grams) | Pressure, p.s.i.g. | Temp., ° F. | Time, min. |
| I | 1.03 | 3.72 | 28 | 90 | 180–40 | 85–75 | 90 |
| II | 1.10 | 4.80 | 24 | 90 | 600–90 | 87–100 | 270 |
| III | 1.10 | 4.80 | 27 | 75 | 600–50 | 115–120 | 150 |
| IV | 1.00 | 4.80 | 30 | 82 | 100 | 87–115 | 150 |
| V | 1.0 | | 24 | 80 | 400 | 120–110 | 180 |
| VI | 0.58 | 5.50 | 25 | 66 | 0 | 55–65 | 180 |

TABLE II

| Example No. | I | II | III | IV |
|---|---|---|---|---|
| Weight of recovered product, grams | 103 | 114 | 117 | 75 |
| Weight percent yield of product, based on amount of propylene reactant | 85 | 92 | 94 | 74 |
| Distribution of product: | | | | |
| Fractions, wt. percent of total products*: | | | | |
| $C_6$ olefins | 94.54 | 95.32 | 93.70 | 93.86 |
| $C_7$ olefins | 0.78 | 0.09 | 0.71 | 1.12 |
| $C_9$ olefins | 4.67 | 4.60 | 5.59 | 5.13 |
| Components, wt. percent of total products*: | | | | |
| 4-methylpentene-1 and 3-methylpentene-1 | 1.13 | 0.73 | 1.26 | 1.77 |
| cis-4-methylpentene-2 | 4.40 | 3.55 | 4.55 | 7.19 |
| 2,3-dimethylbutene-1 and trans-4-methylpentene-2 | 21.59 | 28.76 | 29.94 | 31.88 |
| Hexene-1 and 2-methylpentene-1 | 14.48 | 13.78 | 12.44 | 10.46 |
| trans-Hexene-3 | 4.82 | 4.41 | 4.29 | 4.95 |
| cis-Hexene-3 | 0.38 | 0.91 | 0.62 | 0.58 |
| trans-Hexene-2 | 15.56 | 13.38 | 13.57 | 9.99 |
| 2-methylpentene-2 | 28.57 | 26.02 | 24.10 | 30.02 |
| cis-Hexene-2 and cis-3-methylpentene-2 | 2.98 | 3.55 | 3.61 | 3.17 |
| 2,3,3-trimethylbutene-1 | 0.88 | 0.52 | | |
| $C_9$ olefins | 5.21 | 5.04 | 5.63 | |

*Analyses by gas chromatography after hydrogenation or by mass spectrometer.

TABLE III
Hydrogenation of Products

| Example No. | Components in hydrogenated product, wt. percent | | | |
|---|---|---|---|---|
| | 2,3-dimethylbutane | 2-methylpentane | n-Hexane | $C_9$ saturates |
| II | 77.84 | | 22.04 | |
| III | 10.56 | 61.34 | 21.86 | 6.23 |
| IV | 66.57 | | 22.70 | 10.72 |

EXAMPLE VIII

A catalyst solution, which was prepared with 1.0 mmole of Ce(acac)$_3$ and 24 mmol of Et$_3$Al$_2$Cl$_3$ in 81 g. of chlorobenzene solvent, was transferred into the reactor. Propylene was reacted with this phosphine-free catalyst solution for a period of 2.5 hours in the pressure range of about 280 to 420 p.s.i.g. and at about 110 to 122° F. The propylene was dimerized to hexenes at about 93% selectivity and 55% yield, based on the amount of propylene feed. Product distribution obtained with this catalyst system is quite similar to the results obtained with the catalyst systems containing triphenylphosphine; catalyst activity, however, as indicated by the low product yield, is substantially less in the phosphine-free composition.

Details of the reaction conditions and product analyses are listed in Tables IV, V and VI.

EXAMPLE IX

A similar catalyst solution was prepared by injecting chlorobenzene solution of Et$_3$Al$_2$Cl$_3$ (22 mmoles) into a mixture of 0.7 mmol of Ce(acac)$_3$ and 26 mmoles of $\phi_3$P in chlorobenzene. Total amount of chlorobenzene in this catalyst system was 85 g.

Immediately thereafter, the catalyst solution was introduced into the autoclave, ethylene was fed into the reactor at pressures in the range of about 60 to 150 p.s.i.g. and at room temperature. A rapid pressure drop was observed along with temperature elevation within a few minutes. The temperature of the system was maintained at about 120 to 180° F. during the reaction by controlling the feed rate of ethylene. Reaction was discontinued after 1½ hours. About 3 moles of ethylene was observed to have been dimerized to butenes using 0.7 mmole of catalyst within 1½ hours. The products were analyzed to be 5.8% hexenes and 94.2% butenes. Distribution of butene products is given in Table IV. It appears, therefore, that under similar conditions ethylene is dimerized much faster than propylene in this catalyst solution.

EXAMPLE X

Another ternary catalyst system was similarly prepared with 1.1 mmoles of LaCl$_3$·7H$_2$O, 5.2 mmoles of $\phi_3$P and 24 mmoles of Et$_3$Al$_2$Cl$_3$ in 95 g. of chlorobenzene. The system was not a homogeneous solution. Some precipitate, which may be attributed to the limited solubility of LaCl$_3$·H$_2$O in chlorobenzene solvent, was observed to be suspended in the system.

Propylene was introduced into the system at the pressure range of about 300 to 500 p.s.i.g. and at about 120° F. The pressure drop pattern showed that reaction proceeded fairly rapidly under the aforementioned conditions. About 2 moles of propylene was dimerized almost exclusively to hexenes in about 60% conversion within 1½ hours. The product distribution was found to be as shown in Tables V and VI.

TABLE IV

| Example No. | Catalyst composition, millimoles | | | | Reaction conditions | | |
|---|---|---|---|---|---|---|---|
| | Ce(acac)$_3$ | $\phi_3$P | Et$_3$AlCl$_3$ | Chlorobenzene (grams) | Pressure, p.s.i.g. | Temp., °F. | Time, min. |
| VIII | 1.0 | 0 | 24 | 81 | 280-420 | 110-122 | 150 |
| IX | 0.7 | 2.6 | 22 | 85 | 60-150 | 120-180 | 90 |
| X | *1.1 | 5.2 | 24 | 95 | 300-500 | 120 | 90 |

* LaCl$_3$=7H$_2$O.

TABLE V

| Example No | VIII | IX | X |
|---|---|---|---|
| Weight percent yield of product, based on amount of olefin reactant [1] | 55 | | 60 |
| Distribution of product, wt. percent: | | | |
| 4-methylpentene-1 and 3-methylpentene-1 | 2.56 | | 2.36 |
| cis-4-methylpentene-2 | 7.29 | | 9.16 |
| 2,-3dimethylbutene-1 and trans-4-methylpentene-2 | 51.17 | | 36.99 |
| Hexene-1 and 2-methylpentene-1 | 1.21 | | 16.26 |
| trans-Hexene-3 | 4.72 | | 4.14 |
| cis-Hexene-3 | 0.40 | | 0.46 |
| trans-Hexene-2 | 18.35 | | 13.40 |
| 2-methylpentene-2 | 2.83 | | [2]13.32 |
| cis-Hexene-2 and cis-3-methylpentene-2 | 4.72 | | 3.69 |
| 2,3,3-trimethylbutene-1 | | | [3]30.22 |
| $C_9$ olefins | 5.53 | | |
| Isobutene and butene-1 | | 4.08 | |
| transbutene-2 | | 66.47 | |
| cis-Butene-2 | | 29.39 | |

[1] Analysis by gas chromatography.
[2] 2-methylpentene-2 and 4,4-dimethylbutene-1.
[3] 2,3-dimethylbutene-2.

TABLE VI

| Example No. | Components in hydrogentated products, wt. percent | | | |
|---|---|---|---|---|
| | 2,3-dimethylbutane | 2-methylpentane | n-Hexane | $C_9$ saturates |
| VIII | 0.94 | 63.27 | 29.62 | 5.67 |
| X | 75.29 | | 22.71 | |

It is claimed:
1. A process for polymerizing an olefinic hydrocarbon of 2 to about 8 carbon atoms and mixtures thereof to a normally liquid polymer which comprises polymerizing said olefinic hydrocarbon and mixtures thereof in contact with a catalyst comprising
 (A) a lanthanide series metal compound selected from the group consisting of
  (i) lanthanide series metal salts of mineral acids,
  (ii) lanthanide series metal salts of carboxylic acids having at least 4 carbon atoms and
  (iii) lanthanide series metal complexes;

(B) a reducing agent which is capable of reducing the lanthanide series metal in (A) to a lower oxidation state but not to the elemental metal;
(C) a non-protonic Lewis acid; and
(D) a complex forming amount of a trihydrocarbyl phosphine, the molar ratio of (B) to (A) being about 3 to 40:1, the molar ratio of (C) to (A) being about 3 to 40:1, and the said components (B) and (C) being combined with (A) to reduce the lanthanide series metal (A) to a lower oxidation state and the molar ratio of (D) to (A) being from about 1:1 to about 10:1.

2. A process of claim 1 wherein the reducing agent (B) is selected from the group consisting of trialkylaluminums, monoalkoxydialkylaluminums, and dialkylaluminum hydrides, wherein the alkyl and alkoxy groups have up to about 6 carbon atoms; Grignard reagents; allyl and alkyl tin complexes; and compounds of the formula $MAlR_4$ and $MBeR_3$ wherein M is an alkali metal and R is alkyl of 2 to 6 carbon atoms, and the Lewis acid (C) is selected from the group consisting of aluminum chloride, zinc chloride, stannic chloride, boron trifluoride and boron trifluoride etherates.

3. A process of claim 2 wherein (D) is a trihydrocarbyl phosphine of the formula $$R''_3P$$

wherein R'' is a hydrocarbon radical of 1 to about 12 carbon atoms.

4. A process of claim 3 wherein each R'' is selected from alkyl, aryl, alkaryl and aralkyl, (A) is selected from cerium and lanthanum and the polymerization is conducted in the presence of an inert solvent.

5. A process of claim 1 wherein (B) and (C) are each selected from a reducing agent and non-protonic Lewis acid having the formula $$R'_{(n-y)}M'X_y$$

wherein M' is a metallic element of coordination number $n$ whose halides are Lewis acids, X is halogen having an atomic number of 9 to 53, R' is hydrocarbyl of 2 to 6 carbon atoms, $y$ is a number having a value from greater than 0 to less than $n$.

6. A process of claim 5 wherein M' is selected from the group consisting of aluminum, zinc and tin.

7. A process of claim 6 wherein M' is aluminum.

8. A process of claim 5 wherein X is selected from chloride and bromide.

9. A process of claim 8 wherein the molar ratio of (B) and (C) to (A) is from 5 to 30:1 and the olefinic hydrocarbon is selected from ethylene, propylene and styrene.

10. A process of claim 8 wherein M' is aluminum and X is chloride.

11. A process of claim 10 wherein the molar ratio of (B) and (C) to (A) is from 5 to 30:1 and the olefinic hydrocarbon is propylene.

12. A process of claim 11 wherein (D) is a trihydrocarbyl phosphine of the formula $$R''_3P$$

wherein R'' is a hydrocarbon radical of 1 to about 12 carbon atoms and the polymerization process is conducted in the presence of an inert solvent, and the molar ratio of (D) to (A) is from about 1 to 6:1.

13. A process of claim 12 wherein each R'' is selected from alkyl, aryl, alkaryl and aralkyl, (A) is selected from cerium and lanthanum.

14. A process of claim 8 wherein (D) is a trihydrocarbyl phosphine of the formula $$R''_3P$$

wherein R'' is a hydrocarbon radical of 1 to about 12 carbon atoms, the molar ratio of (D) to (A) is from about 1 to 6:1, and the polymerization process is conducted in the presence of an inert solvent.

15. A process of claim 4 wherein each R'' is selected from alkyl, aryl, alkaryl and aralkyl, (A) is selected from cerium and lanthanum and the olefinic hydrocarbon is selected from ethylene, propylene and styrene.

16. A process of claim 15 wherein the olefinic hydrocarbon is propylene.

17. A process of claim 1 wherein (D) is a trihydrocarbyl phosphine of the formula $$R''_3P$$

wherein R'' is a hydrocarbon radical of 1 to about 12 carbon atoms.

18. A process of claim 17 wherein each R'' is selected from alkyl, aryl, alkaryl and aralkyl, (A) is selected from cerium and lanthanum and the polymerization is conducted in the presence of an inert solvent.

19. A process of claim 18 wherein the olefinic hydrocarbon is propylene.

References Cited

UNITED STATES PATENTS

| | | | |
|---|---|---|---|
| 3,306,948 | 2/1967 | Kealy | 260—680 |
| 3,554,924 | 1/1971 | Kittleman et al. | 252—429 |
| 2,953,531 | 9/1960 | Anderson et al. | 260—94.9 X |
| 3,056,770 | 10/1962 | D'Alelio | 260—94.9 X |
| 3,179,647 | 4/1965 | Mulley et al. | 260—94.9 B |
| 3,297,667 | 1/1967 | Von Dohlen et al. | 260—82.1 |
| 3,334,079 | 8/1967 | Raich | 260—93.7 |
| 3,366,704 | 1/1968 | Stapp | 260—683.15 |
| 3,384,678 | 5/1968 | Stapp | 260—683.15 |
| 3,429,864 | 2/1969 | Stapp | 260—683.15 X |

PAUL M. COUGHLAN, JR., Primary Examiner

U.S. Cl. X.R.

252—429 B, 431 P; 260—669 P

PO-1050
(5/69)

UNITED STATES PATENT OFFICE
CERTIFICATE OF CORRECTION

Patent No. 3,641,188            Dated February 8, 1972

Inventor(s) Jin Sun Yoo and Robert Koncos

It is certified that error appears in the above-identified patent and that said Letters Patent are hereby corrected as shown below:

Column 12, line 18, delete "4", insert in place thereof -- 14 --;

Signed and sealed this 22nd day of August 1972.

(SEAL)
Attest:

EDWARD M. FLETCHER, JR.            ROBERT GOTTSCHALK
Attesting Officer            Commissioner of Patents